(12) United States Patent
Jeon et al.

(10) Patent No.: US 7,724,342 B2
(45) Date of Patent: May 25, 2010

(54) APPARATUS AND METHOD FOR PRINTING BEAD SPACERS ON A LIQUID CRYSTAL DISPLAY SUBSTRATE COMPRISING A PLANAR PRINTING PLATE HAVING RECESSES INCLUDING A RADIAL PROTRUSION DISPOSED AT CENTER

(75) Inventors: Baek-Kyun Jeon, Yongin-si (KR); Jeong-Uk Heo, Seongnam-si (KR); Bong-Sung Seo, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 740 days.

(21) Appl. No.: 11/474,177

(22) Filed: Jun. 23, 2006

(65) Prior Publication Data

US 2006/0290877 A1    Dec. 28, 2006

(30) Foreign Application Priority Data

Jun. 24, 2005    (KR) .................... 10-2005-0054846

(51) Int. Cl.
  *G02F 1/1339*  (2006.01)
  *G02F 1/13*    (2006.01)
(52) U.S. Cl. .................... 349/155; 349/156; 349/187
(58) Field of Classification Search .................... None
  See application file for complete search history.

(56) References Cited

U.S. PATENT DOCUMENTS

| | | | | |
|---|---|---|---|---|
| 5,838,413 A | * | 11/1998 | Matoba et al. | 349/155 |
| 5,992,320 A | * | 11/1999 | Kosaka et al. | 101/401.1 |
| 6,888,596 B2 | * | 5/2005 | Nakayoshi et al. | 349/113 |
| 7,295,279 B2 | * | 11/2007 | Byun et al. | 349/187 |
| 2004/0112858 A1 | * | 6/2004 | Yang | 216/23 |

(Continued)

FOREIGN PATENT DOCUMENTS

JP    9-152615    6/1997

(Continued)

OTHER PUBLICATIONS

Patent Abstracts of Japan, Publication No. 09-152615, Jun. 10, 1997, 1 p.

(Continued)

*Primary Examiner*—Andrew Schechter
*Assistant Examiner*—Paisley L Arendt
(74) *Attorney, Agent, or Firm*—Innovation Counsel LLP

(57) ABSTRACT

An apparatus for printing bead spacers at selected locations on an LCD substrate includes a cylindrical transfer roller and a printing plate having a plurality of semispherical recesses respectively located at positions corresponding to the selected locations of the spacers on the LCD substrate. A volume of an ink containing the spacers is loaded into each of the recesses, and the substrate is translated tangentially relative to the rotating transfer roller such that the volumes of ink are transferred onto the roller. A support plate having the LCD substrate mounted thereon is then translated tangentially relative to the roller such that the volumes of ink on the roller are transferred onto the surface of the LCD substrate at the selected locations. The apparatus enables the spacers to be printed onto the LCD substrate accurately and inexpensively, and prevents the spacers from being inadvertently printed in double layers.

19 Claims, 7 Drawing Sheets

U.S. PATENT DOCUMENTS

2007/0019148 A1* 1/2007 Ueda .......................... 349/155

FOREIGN PATENT DOCUMENTS

| | | |
|---|---|---|
| JP | 2000-35582 | 2/2000 |
| JP | 2000-86307 | 3/2000 |
| KR | 2002-0082506 | 10/2002 |
| KR | 2003-0015778 | 2/2003 |
| KR | 2003-0028925 | 4/2003 |
| KR | 2003-0058162 | 7/2003 |
| KR | 2004-0059100 | 7/2004 |
| KR | 2005-0001880 | 1/2005 |

OTHER PUBLICATIONS

Patent Abstracts of Japan, Publication No. 2000-035582, Feb. 2, 2000, 1 p.

Patent Abstracts of Japan, Publication No. 2000-086307, Mar. 28, 2000, 1 p.

Korean Patent Abstracts, Publication No. 1020020082506, Oct. 31, 2002, 1 p.

Korean Patent Abstracts, Publication No. 1020030015778, Feb. 25, 2003, 1 p.

Korean Patent Abstracts, Publication No. 1020030028925, Apr. 11, 2003, 1 p.

Korean Patent Abstracts, Publication No. 1020030058162, Jul. 7, 2003, 1 p.

Korean Patent Abstracts, Publication No. 1020040059100, Jul. 5, 2004, 1 p.

Korean Patent Abstracts, Publication No. 1020050001880, Jan. 7, 2005, 1 p.

* cited by examiner

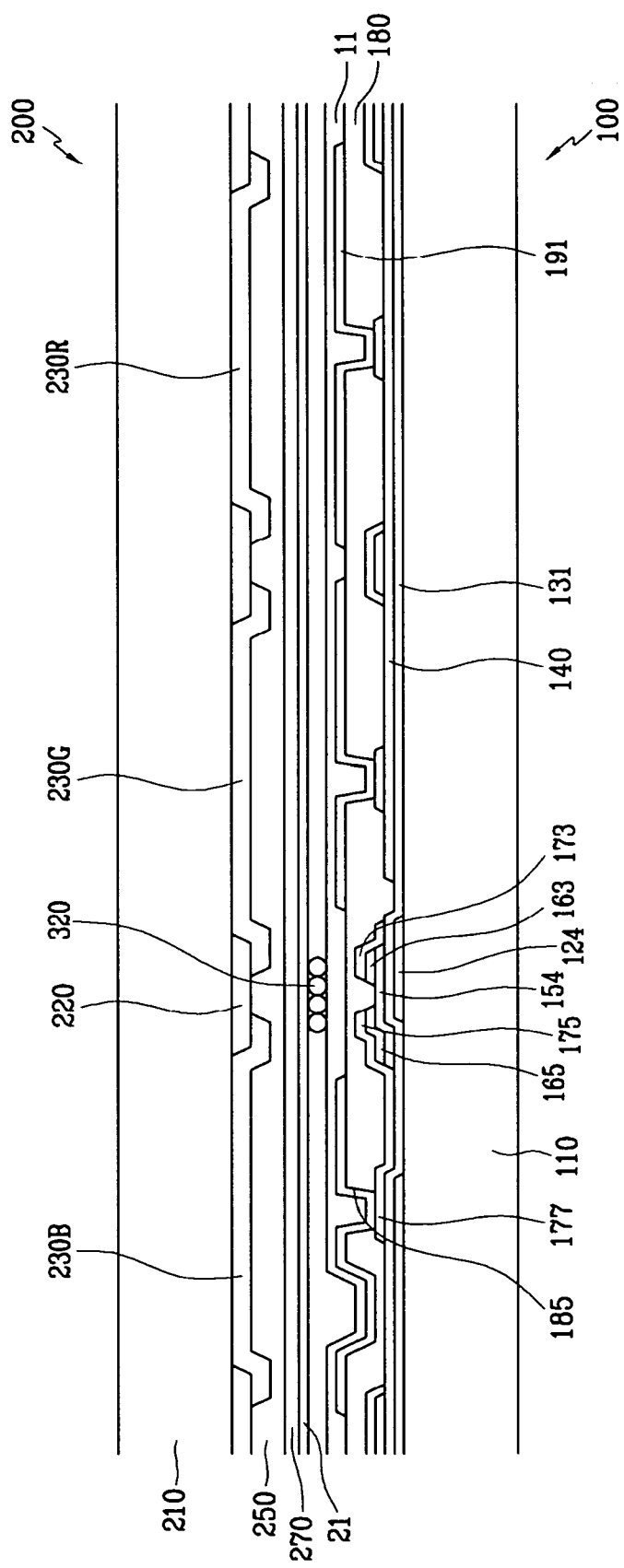

APPARATUS AND METHOD FOR PRINTING BEAD SPACERS ON A LIQUID CRYSTAL DISPLAY SUBSTRATE COMPRISING A PLANAR PRINTING PLATE HAVING RECESSES INCLUDING A RADIAL PROTRUSION DISPOSED AT CENTER

RELATED APPLICATIONS

This application claims priority of Korean Patent Application No. 10-2005-0054846, filed Jun. 24, 2005, the entire contents of which are incorporated herein by reference.

BACKGROUND

The present invention relates, in general, to apparatus for manufacturing liquid crystal displays (LCDs), and more particularly, to apparatus for printing bead spacers at selected locations on LCD substrates.

An LCD, which is one of the more widely used types of flat panel displays, includes two substrates, or panels, having electric field generating electrodes, i.e., pixel electrodes and a common electrode, with a liquid crystal layer interposed therebetween. The LCD displays an image by applying a voltage to the electrodes to generate an electric field in the liquid crystal layer to selectively align the molecules of the liquid crystal layer and thereby control the polarization of light passing through the layer.

Upper and lower substrates of the liquid crystal display apparatus are attached to each other by means of a sealing member formed around the respective peripheries of the substrates to confine the liquid crystal material in the space between the two substrates. The upper and lower substrates are supported relative to each other by a plurality of spacers disposed between the substrates that define and maintain a selected cell gap, or spacing, between the two substrates.

The spacers can comprise either "bead-type" spacers having a generally spherical shape, which are distributed between the substrates in a random, or irregular pattern, and columnar spacers that are distributed between the spacers in a regular pattern.

The columnar spacers are formed by coating a photosensitive film on a color filter panel of the LCD and then exposing and developing the film such that the spacers are distributed in a desired pattern corresponding to channels, gate lines, storage electrode lines, light blocking members, or other regions of the panel through which light is not transmitted. Accordingly, when columnar spacers are used in an LCD, a separate, additional photolithography process is needed, so that the production cost of the panel increases correspondingly. Additionally, unlike the plastic-based bead spacers, the columnar spacers have a relatively low elasticity, such that the margin for liquid crystal filling errors is reduced. Thus, use of columnar spacers can result in LCD panel charging problems as well as smearing of underlying layers of the panel.

On the other hand, while the irregularly distributed bead spacers do not require an additional photolithography process, the bead spacers can be located in light transmitting areas of the panel, and thus, act like extrinsic materials to cause leakage of light from the panel, thereby causing a deterioration in the light contrast of the panel. Additionally, it is possible for a portion of the bead-type spacers to move slightly during placement, and thereby cause damage to an alignment layer of the panel. Further, it is possible to inadvertently deposit the bead spacers in stacked, or double layers, such that the substrates of the LCD are spaced too far apart at some locations.

What is needed, then, is a technique that enables the less expensive bead-type spacers to be deposited on LCD substrates at precise, selected locations thereon, and which prevents the spacers from being deposited in thicknesses greater than a single layer of the spacers.

SUMMARY OF THE INVENTION

In accordance with the present invention, an apparatus is provided for printing bead spacers at precise, selected locations on an LCD substrate, and which prevents the spacers from being printed on the substrate in thicknesses of more than a single layer of the spacers.

In one advantageous exemplary embodiment thereof, the apparatus comprises a generally planar printing plate having a plurality of recesses formed in a first surface thereof, and a rotating cylindrical transfer roller having an exterior transfer surface. Each of the recesses in the printing plate defines a segment of a sphere having a radial protrusion disposed at the center thereof, and are formed at respective longitudinal and transverse locations corresponding to the respective longitudinal and transverse locations of the spacers to be printed onto the LCD substrate.

The exemplary apparatus further includes means for loading a volume of a heat- or UV-curing ink containing a plurality of bead spacers into each of the recesses of the printing plate, and means for translating the first surface of the printing plate tangentially relative to and at the same velocity as the exterior surface of the rotating roller, such that the volumes of ink in the recesses are transferred onto the exterior surface of the transfer roller.

The apparatus further includes a support plate for supporting the LCD substrate, and means for translating the support plate such that a surface of the substrate moves tangentially relative to and at the same velocity as the exterior surface of the rotating transfer roller and thereby transfers the volumes of ink on the surface of the roller onto the surface of the LCD substrate at the respective selected longitudinal and transverse locations thereon.

The printing plate can comprise glass, and the recesses can be formed advantageously by use of a $CO_2$ laser or a YAG laser. In an alternative embodiment, the printing plate can comprise a double-layered structure of glass and resin, with the recesses being formed on the resin layer.

The spacer ink used in the apparatus preferably comprises a mixture of bead-type spacers and a liquid thermosetting or UV-curing binder. The ink supplying and loading means of the exemplary apparatus can include a spacer tank for containing the spacer ink, a nozzle for dispensing the spacer ink from the spacer tank onto the printing plate, and a stirrer disposed within the tank to keep the spacers mixed uniformly within the ink. The ink can be conveyed from the tank to the nozzle by means of a pump disposed between the spacer tank and the nozzle, or alternatively, the tank can be provided with a gas pressure mechanism for forcing the ink from the tank to the nozzle. Wiper blades are arranged to move relative to the first surface of the printing plate and thereby distribute the ink mixture over the surface of the printing plate and screed it into the recesses thereof.

A better understanding of the above and many other features and advantages of the bead spacer printing apparatus of the present invention may be obtained from a consideration of the detailed description of the exemplary embodiments thereof below, particularly if such consideration is made in conjunction with the several views of the appended drawings, wherein like reference numerals are used to identify like elements illustrated in one or more of the figures thereof.

DETAILED DESCRIPTION

Figure 1:
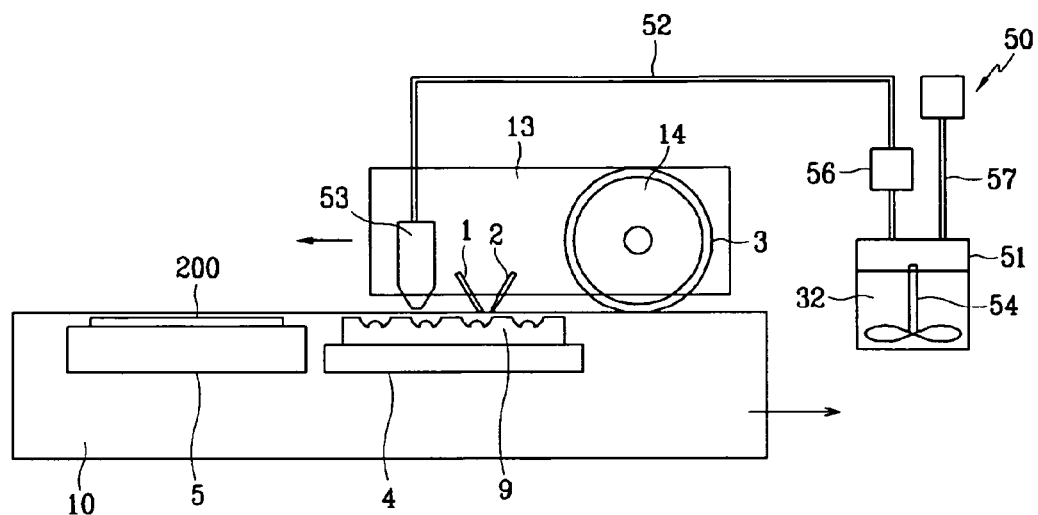
FIG. 1 is a schematic side elevation view of an exemplary embodiment of an apparatus for printing bead spacers at selected locations on an LCD substrate in accordance with the present invention.

FIG. 1 is a schematic side elevation view of an exemplary embodiment of an apparatus for printing bead spacers at selected locations on an LCD substrate in accordance with the present invention. As shown in FIG. 1, the apparatus includes a printing plate 9, a rotating transfer roller 14, a spacer ink supplying unit 50, and a support plate 5 on which an LCD panel, or substrate 200, is mounted. The printing plate 9 and the support plate 5 are disposed in a lower support frame 10 of the apparatus, and the transfer roller 14 and the ink supplying unit 50 are provided in an upper support frame 13 thereof.

In one exemplary embodiment, the printing plate 9 is made of glass and is supported on a printed support board 4. An upper or first surface of the printing plate includes a plurality of recesses 19 formed into it at selected longitudinal and transverse locations. Specifically, the recesses are formed at respective longitudinal and transverse locations that correspond to the respective longitudinal and transverse locations of the spacers 320 to be printed onto the LCD panel 200. The LCD display panel 200 on which the spacers 320 are to be formed is loaded on an upper surface of the support plate 5.

The spacer ink 32 preferably comprises a mixture of a plurality of bead-type spacers 320 and a liquid binder 321 that is curable to fix the spacers 320 on the display panel 200. The spacers 320 are made of an acrylic-based organic material that is capable of forming a polymer, such as Teflon, benzocyclobutene (BCB), cytop, perfluorocyclobutene (PFCB), or other organic materials having a lower dielectric constant. The curable binder material 321 may be a thermosetting material or an ultraviolet (UV)-curing material. The ink supplying unit 50 functions to dispense the spacer ink mixture 32 onto the printing plate 9, and as shown in FIG. 1, includes a tank 51 for holding the spacer ink, a dispensing nozzle 53, and a stirrer 54 disposed within the tank.

The nozzle 53 is disposed at a selected distance above the printing plate 9. The nozzle 53 dispenses the spacer ink 32 supplied from the spacer tank 51 onto the printing plate 9. The spacer tank 51 and the nozzle 53 are connected to each other by a supply conduit 52. The spacer ink 32 is conveyed from the tank 51 to the nozzle 53 by an ink pump 56 disposed in the supply conduit 52 between the spacer tank 51 and the nozzle 53, or alternatively, by means of a gas pressure mechanism 57 associated with the ink tank 51, which injects a pressurized gas, e.g., nitrogen ($N_2$) or air, into the tank 51 to force the spacer ink 32 to the dispensing nozzle 53.

The stirrer 54 stirs the spacer ink 32, so that the ink mixture does not separate or the spacers do not become non-uniformly distributed within it. In general, the spacer ink 32 has a viscosity of tens of thousands to hundreds of thousands of centipoise (cp), and needs to be continuously stirred so as to prevent separation or non-uniform distribution of the spacers 320 within the liquid binder material 321.

A transfer sheet 3 comprising, e.g., silicon, or another material having a good hydrophilic property, is attached to the exterior surface of the transfer roller 14. One or more wiper blades 1 and 2 are provided between the dispensing nozzle 53 and the transfer roller for spreading the spacer ink 32 on the printing plate 9 uniformly and for forcing it into the recesses 19 thereof, in the manner of a screed or a squeegee.

Figure 2:
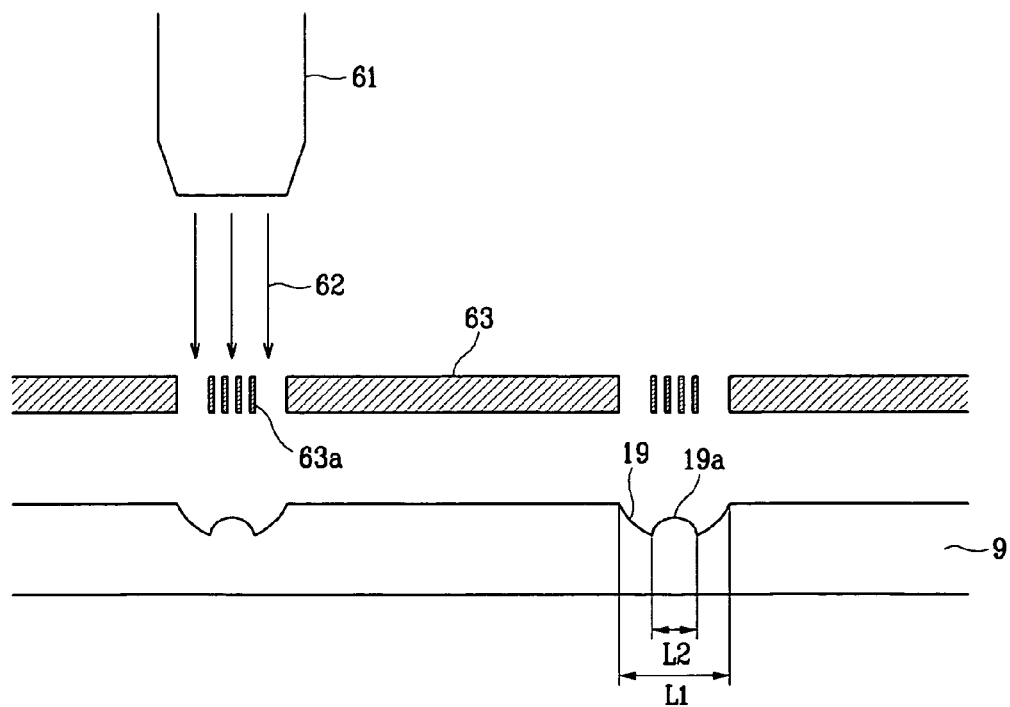
FIG. 2 is a partial cross-sectional view of a printing plate of the apparatus, showing the formation of a plurality of recesses in a surface thereof using a laser.

FIG. 2 is a partial cross-sectional view showing the formation of recesses 19 in the upper or first surface of a glass printing plate 9 using a laser. As illustrated in FIG. 2, the recesses 19 formed in the printing plate 9 have a shape corresponding to a segment of a sphere having a diameter L1. Additionally, each of the recesses incorporates a semispherical radial protrusion 19a having a diameter L2 formed at the center of the recess. As discussed below, this recess configuration ensures that the individual groups of bead spacers 320 deposited onto the printing plate 9, and ultimately, onto the LCD panel 200, will be deposited, not in multi-layered structures, but rather, in a single-layered structure having a planar, annular shape of a ring or a doughnut, as illustrated in the enlarged detail view of FIG. 5B.

In the particular exemplary embodiments illustrated, the recesses 19 are formed in the printing plate 9 using a laser 61, such as a $CO_2$ laser or a YAG laser. The YAG laser, for example, incorporates an oscillator that generates a laser beam using yttrium, aluminum, and garnet.

The laser 61 heats a portion of the printing plate 9 that is illuminated with the laser beam 62 to such a high temperature as to ablate, or burn, the recesses 19 into the surface of the plate. As will be appreciated, the ablated interior surfaces of the recesses 19 that result are very smooth, so that the spacers 320 are easily transferred into the surface from the plate to the exterior surface of the transfer roller 14. Additionally, since the walls of the recesses 19 are semispherical in shape, the walls of the recesses react with the generally spherical shape of the spacers to release the spacers readily from the recesses to ensure that none of the spacers 320 remain in the recesses after the transfer. Further, since a laser process, rather than a photolithography process, is used to form the recesses 19, no large photolithography masks are required, so that production costs are correspondingly reduced.

In addition, since the recesses 19 are formed with a laser on a glass printing plate 9, rather than a plate of an iron material, relatively thin printing plates 9 can be employed. As will be appreciated, in the case of a large plate made of an iron material, the plate 9 must be relatively thick to ensure plate flatness and accuracy of the recess positions, and to prevent deformation of the plate in response to changes in temperature and pressure. The use of a laser in conjunction with a thin, glass printing plate eliminates the foregoing problems.

As illustrated in FIG. 2, the circular protrusions 19a formed at the centers of the recesses 19 can be effected by using an optic system 63 disposed between the laser generating unit 61 and the printing plate 9. The optic system 63 includes circular apertures that are positioned over the printing plate with respective longitudinal and transverse locations corresponding to those desired of the recesses 19 in the plate. Each of the apertures has a central slit pattern 63a corresponding to the location of a corresponding semispherical protrusion 19a, and functions to reduce the intensity of the laser beam 62 that is illuminated onto the area of the corresponding recess 19. The intensity of the laser beam 62 is thus relatively weak at the central portions of the regions in which the recesses 19 are formed, but remains relatively strong at the edge portions thereof. As a result, each of the recesses 19 is formed to incorporate a semispherical protrusion 19a at the center thereof, as illustrated in FIG. 2.

Figure 3:
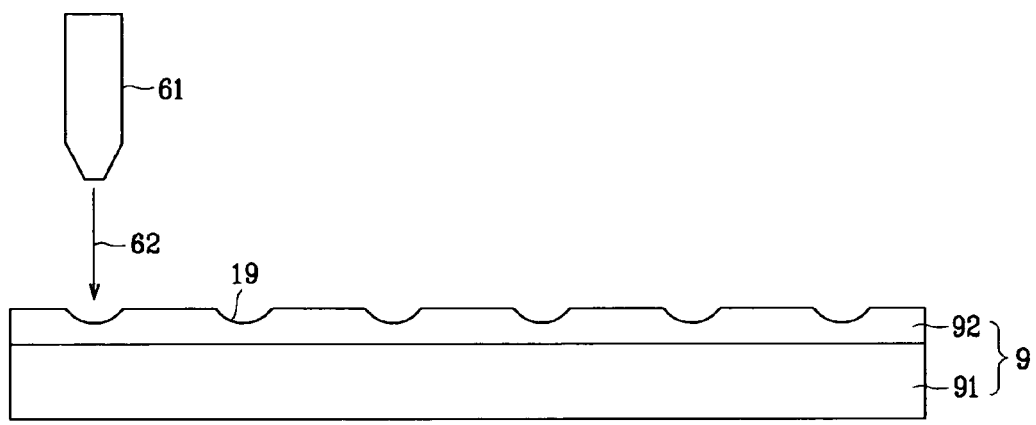
FIG. 3 is a partial cross-sectional view of an alternative, double-layered embodiment of the printing plate of the apparatus, showing the formation of recesses in a surface thereof using a laser.

As illustrated in FIG. 3, in an alternative exemplary embodiment, the printing plate 9 can comprise a double-layered structure of glass and resin layers 91 and 92, respectively. In this embodiment, the recesses 19 are preferably formed in the resin layer 92, rather than in the glass layer, by use of a laser beam 62. FIG. 3 shows the formation of the recesses on the double-layered glass and resin printing plate with a laser.

Figure 4:
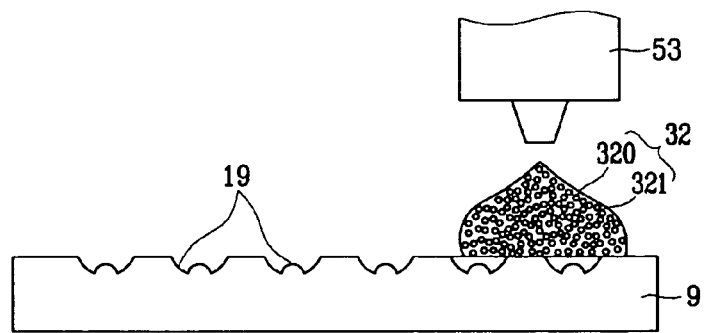
FIG. 4 is a schematic side elevation view showing a spacer ink being dispensed onto the printing plate of the exemplary apparatus.
Figure 5A:
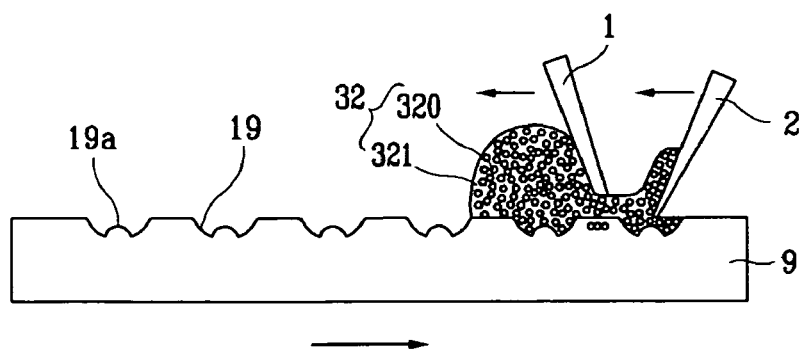
FIG. 5A is a side elevation view showing the spacer ink being uniformly screeded into the recesses of the printing plate by a wiper blade.
Figure 5B:
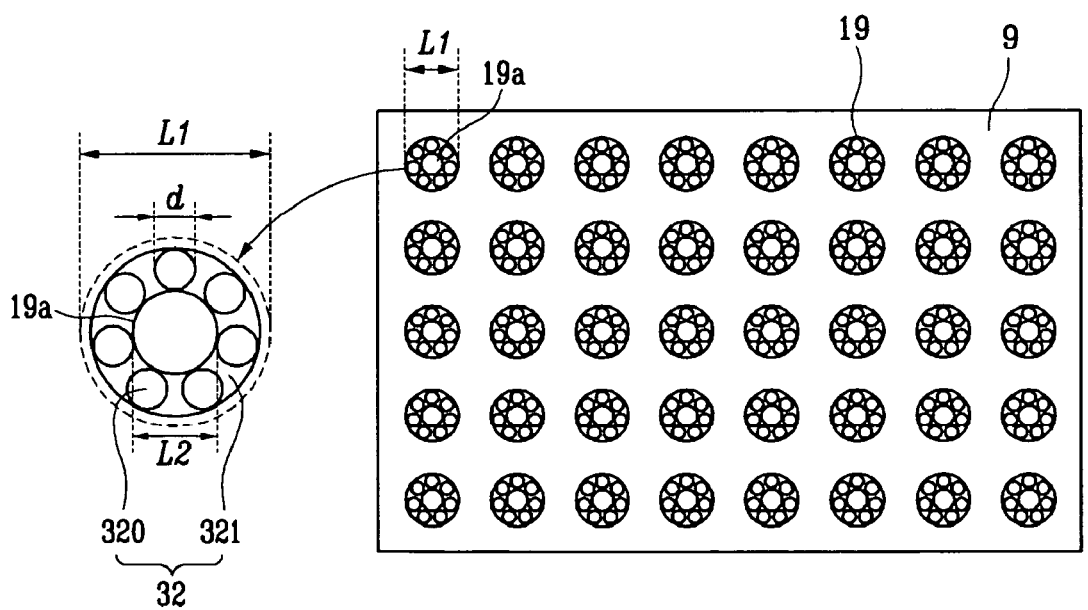
FIG. 5B is a top plan view of the printing plate, showing the spacer ink after being loaded in the recesses of the printing plate, and an enlarged detail view of one of the recesses, showing the uniform, single-layer, ring-shaped distribution of the bead spacers therein.
Figure 6:
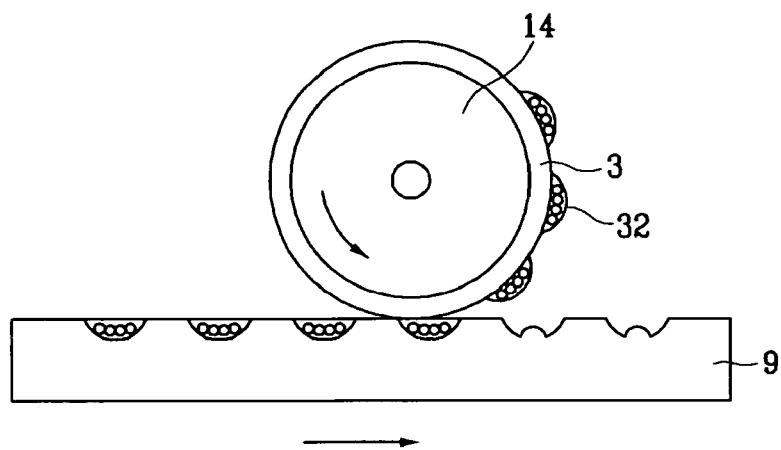
FIG. 6 is a side elevation view of the printing plate and a rotating transfer roller of the apparatus, showing the printing plate translating tangentially relative to and at the same velocity as an exterior surface of the rotating transfer roller so as to transfer the volumes of the spacer ink in the recesses of the printing plate onto the surface of the transferring roller.
Figure 7:
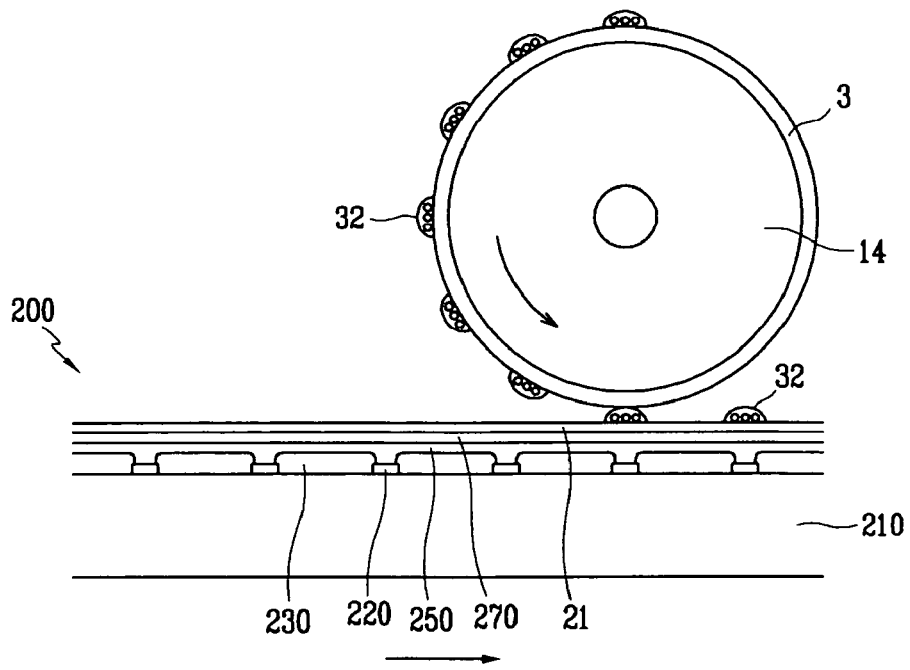
FIG. 7 is a partial side elevation view of the rotating transfer roller and an LCD substrate support plate of the apparatus, showing the support plate and LCD substrate translating such that a surface of the substrate moves tangentially relative to and at the same velocity as the exterior surface of the rotating transfer roller and thereby transfers the volumes of spacer ink onto the surface of the LCD substrate.

A method of printing bead spacers at selected locations on an LCD substrate using the exemplary apparatus of the present invention described above is described below. FIG. 4 illustrates a measured quantity of spacer ink 32 being dispensed onto the upper surface of the printing plate 9. In FIG. 5A, the spacer ink is shown being screeded into the recesses 19 of the printing plate using wiper blades 1 and 2. FIG. 5B is a plan view of the printing plate showing the spacer ink loaded into the recesses of the printing plate, and includes an enlarged detail view of one of the recesses in which the spacers 320 are shown uniformly distributed in a ring-shaped, single-layered group of the spacers. FIG. 6 is a side elevation view showing the volumes of spacer ink being transferred from the recesses of the printing plate to the exterior surface of the transfer roller 14. FIG. 7 is a similar view showing the volumes of spacer ink on the transfer roller being transferred to an LCD substrate 210.

Firstly, as shown in FIG. 4, the spacer ink 32 is dispensed onto the surface containing the recesses 19 of the printing plate 9 by the nozzle 53 of the ink supplying unit 50. At this point, the spacers 320 contained in the spacer ink 32 mixture have been stirred with the stirrer 54 of the ink supplying unit 50 such that the spacers are uniformly distributed within the ink. As above, the spacer ink mixture comprises a curable liquid binder material 321, such as a thermosetting or a UV-curing material.

Next, as shown in FIG. 5A, the spacer ink 32 is spread uniformly over the surface of the printing plate 9 by a spreader blade 1, and then screeded in uniform volumes into the recesses 19 of the printing plate using a second, wiper blade 2. The spreader and wiper blades are disposed relative to the printing plate as shown in the figure and can be arranged to move relative to the printing plate, or alternatively, the plate can be arranged to move relative to the blades, to effect the uniform distribution of the ink on the surface of the plate and the loading of the recesses with the ink. If desired, the excess ink that is wiped from the plate by the wiper blade can be captured in a tray (not illustrated) in the upper support frame 13 and re-circulated to the ink tank 51 of the ink supply system 50 for reuse.

As shown in FIG. 5B, a uniform volume of the spacer ink 32 is loaded into each of the recesses 19, such that the spacers 320 in each of the recesses 19 are arranged by the configuration of the recesses into a ring-shaped, single-layered group surrounding the semispherical protrusion 19a at the center of the groove 19. Of importance, this arrangement prevents the spacers 320 from being formed into structures having a thickness greater than a single layer of the spacers, e.g., into two-layered structures, thereby ensuring that the spacers defining the cell gap of the LCD will all be of a uniform, consistent height.

As shown in FIG. 6, after the recesses of the printing plate 9 have been loaded with their respective volumes spacer ink 32, the plate is translated tangentially relative to and at the same velocity as the outer surface of the transfer sheet 3 on the rotating transfer roller 14, such that the volumes of spacer ink 32 in the recesses of the plate are transferred onto the surface of the transfer sheet. As will be appreciated, as a result of this arrangement, the volumes of spacer ink 32 are transferred to the surface of the transfer sheet 3 at circumferential and axial locations that correspond precisely to the longitudinal and transverse locations of the recesses 19 in the printing plate 9, and further, this result will obtain whether the surface of the roller is translated relative to the surface of the plate or vice versa.

Next, as shown in FIG. 7, the transfer roller 14, which has the volumes of spacer ink 32 temporarily adhered thereto, is translated tangentially and at the same velocity relative to a support plate (not illustrated) having an LCD panel 200 mounted thereon, such that the volumes of spacer ink 32 are then transferred onto the surface of the display panel 200 at the selected longitudinal and transverse locations thereon, i.e., at longitudinal and transverse locations corresponding to those of the recesses 19 in the printing plate 9. As above, this result obtains whether the transfer roller 14 is moved relative to the LCD panel 200 or vice versa.

FIG. 7 illustrates the spacer ink 32 being transferred onto a display panel 200 on which a light blocking member 220, color filters 230, an overcoat film 250, a common electrode 270, and an alignment layer 21 are sequentially stacked. It should be understood that these features are located in areas of the LCD in which the orientation of the liquid crystal molecules is not controlled, and accordingly, in which no image is formed by the display. In accordance with the present invention, the spacers 320 are accurately placed in the region corresponding to the light blocking member 220, which prevents the spacers from creating leakage of light from the display as a result of being placed in light forming regions of the display.

Figure 8:
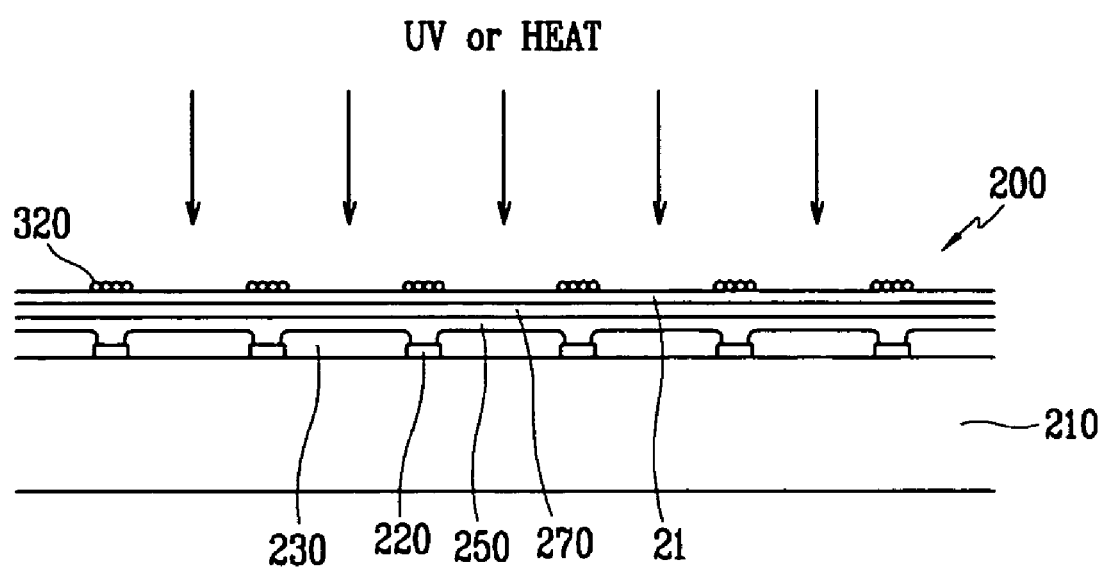
FIG. 8 is a partial side elevation view of the LCD substrate, showing heat or UV radiation being applied to the substrate to cure the volumes of spacer ink printed thereon into single-layer, ring-shaped groups of bead spacers.

As illustrated in FIG. 8, the printed spacers 320, together with the curable liquid binder 321, are subsequently cured by the application of heat or UV light to the display panel 200 to securely fix the spacers thereon.

In the next step in the assembly of an LCD, the display panel 200, i.e., an upper panel having cured spacers 320 disposed thereon, is pressed down onto and attached to a lower panel 100, as illustrated in the partial cross-sectional view of FIG. 10B. By such an arrangement, the apparatus of the present invention enables the ring-shaped groups of bead spacers 320 to be printed at precise, selected locations on the upper display panel 200 that correspond to the positions of the light blocking regions of the display, and such that the spacer groups define and maintain a precise, uniform cell gap between the display panels. In addition, since the spacers act to strengthen the elastic force between the display panels, they serve to prevent so-called "smear defects" that can occur when the display panel 200 is pressed. Accordingly, the apparatus of the present invention enables all of the advantages of bead-type spacers to be obtained in an LCD, i.e., a high elastic force between the substrates of the LCD, as well as the advantages of the more expensive columnar spacers, i.e., the prevention of light leakage from certain locations of the panel. Additionally, the apparatus enables the spacer formation process to be considerably simplified, thereby making process manage easier and ensuring good yields of LCDs.

Figure 9:
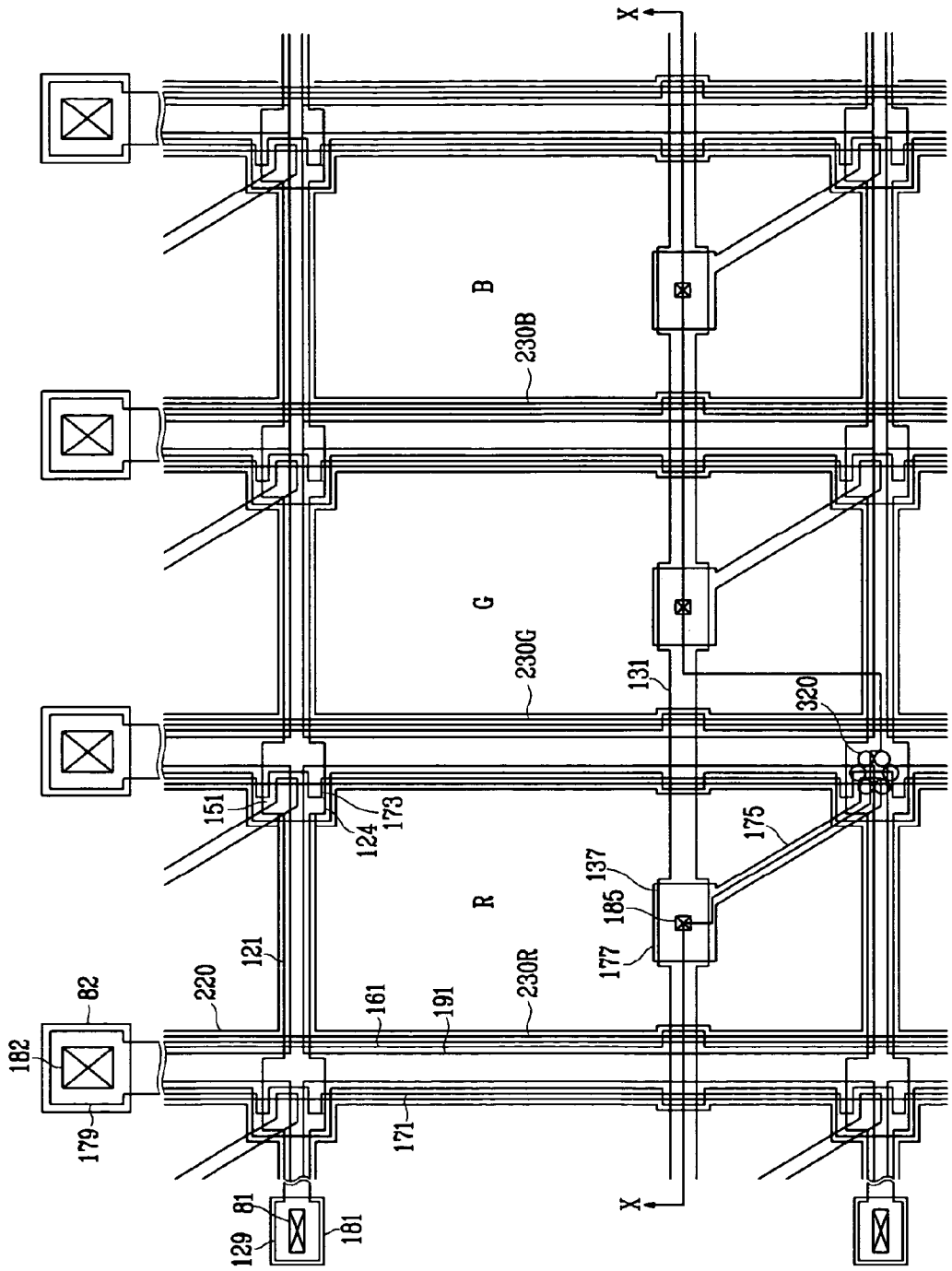
FIG. 9 is a top plan view of a thin film transistor LCD panel on which ring-shaped groups of bead spacers have been printed using the exemplary bead printing apparatus of the present invention; and, FIG. 10 is a partial cross-sectional view of the thin film transistor panel as seen along the section lines X-X taken in FIG. 9.

FIG. 9 is a top plan view of a thin film transistor (TFT) panel 100 having an upper panel 200 upon which ring-shaped groups of bead spacers 320 have been printed using the exemplary bead spacer printing apparatus of the present invention. FIG. 10 is a cross-sectional view of the LCD panel along the section lines X-X taken in FIG. 9.

As illustrated in FIGS. 9 and 10, a plurality of gate lines 121 and a plurality of storage electrode lines 131 are disposed on an insulating substrate 110 made of a transparent glass or plastic material. The gate lines 121 transmit gate signals and extend generally in a longitudinal direction. The gate lines 121 include a plurality of gate electrodes 124 that protrude upwardly and downwardly and end portions 129 that are enlarged for connection to other layers or external driver circuits. A gate driver circuit (not illustrated) generates and applies the gate signals to the gate lines 121.

Storage electrode lines 131 are supplied with predetermined voltages and extend substantially parallel to the gate lines 121. The storage electrode lines 131 are disposed between adjacent pairs of the gate lines 221 and closer to a lower one of the two. The storage electrode lines 131 include storage electrodes 137 that extend upwardly and downwardly. However, various other shapes and arrangements may be used for the storage electrode lines 131.

A gate insulating layer 140 made of, e.g., silicon nitride ($SiN_x$) or silicon oxide ($SiO_x$), is formed on the gate lines 121 and the storage electrode lines 131. A plurality of semiconductor stripes 151 comprising hydrogenated amorphous silicon (a-Si) or polysilicon are formed on the gate insulating film 140. The semiconductor stripes 151 extend in a transverse direction and include a plurality of protrusions 154 that extend toward the gate electrodes 124. In addition, portions of the semiconductor stripes 151 are enlarged at regions near the gate lines 121 and the storage electrode lines 131 to cover the enlarged areas thereof.

A plurality of line-shaped and island-shaped ohmic contacts 161 and 165 are formed on the semiconductor stripes 151. The ohmic contacts 161 and 165 may be made of made of silicide or an n+ hydrogenated amorphous silicon which is heavily doped with n-type impurities, such as phosphorus (P). The line-shaped ohmic contacts 161 include a plurality of protrusions 163. Each pair of the protrusion 163 and an island-shaped ohmic contact member 165 is disposed on an associated protrusion 154 of an associated semiconductor stripe 151.

A plurality of data lines 171 and a plurality of drain electrodes 175 are formed on the ohmic contact members 161 and 165 and the gate insulating film 140. The data lines 171 transmit data signals and extend generally in the transverse direction to intersect the gate lines 121 and the storage electrode lines 131 orthogonally. The data lines 171 include a plurality of source electrodes 173 that protrude toward the gate electrodes 124 and enlarged end portions 179 that connect to other layers or external driver circuits. A data driver circuit (not illustrated) generates and applies the data signals to the data lines 171

The drain electrodes 175 are separated from the data lines 171 and face an associated source electrode 173, with the associated gate electrode 124 interposed therebetween. The drain electrode 175 includes an enlarged end portion 177 and a bar-shaped end portion. The enlarged end portion 177 overlaps the storage electrode 137, and the bar-shaped end portion is partially surrounded by a curved source electrode 137. One gate electrode 124, one source electrode 173, and one drain electrode 175, together with one protrusion 154 of one semiconductor stripe 151, constitute one thin film transistor (TFT) of the panel. The channel of the thin film transistor is formed in the protrusion 154 between the source electrode 173 and the drain electrode 175.

The ohmic contacts 161 and 165 are interposed only between the underlying semiconductor strips 151 and the overlying data lines 171 and drain electrodes 175, and serve to reduce the contact resistance therebetween.

A protective (i.e., passivation) layer 180 is formed on the data lines 171, the drain electrodes 175, and the exposed portions of the semiconductor stripes 151. A plurality of first contact holes 182 and 185 are formed in the protective layer 180 to expose respective end portions of the data lines 171 and the drain electrodes 175. A plurality of second contact holes 181 are also formed in the protective layer 180 and the gate insulating layer 140 to expose end portions of the gate lines 121.

A plurality of pixel electrodes 191 and a plurality of contact assistants 81 and 82 are formed on the protective layer 180. These elements may be made of a transparent conductive material such as ITO and IZO, or a metal having excellent reflectance, such as aluminum, silver, chromium, or an alloy thereof. Each of the pixel electrodes 191 is physically and electrically connected to an associated drain electrode 175 through the associated contact hole 185, and receives a data voltage applied by the drain electrode 175. A data voltage is applied to the pixel electrode 191, together with a common voltage applied to a common electrode (not shown) disposed in a common electrode panel (not shown), to generate an electric field. The electric field determines the alignment of liquid crystal molecules in the liquid crystal layer (not shown) between the two panels, and accordingly, the polarization of light passing through the liquid crystal layer. The pixel electrode 191 and the common electrode 270 thus constitute a capacitor (i.e., a liquid crystal capacitor) that sustains the applied voltage after the thin film transistor-turns off.

The pixel electrode 191 and the drain electrode 175 connected thereto overlap the storage electrode line 131. The capacitor formed by overlapping the pixel electrode 191 and the drain electrode 175 connected thereto with the storage electrode line 131 is referred to as a storage capacitor. The storage capacitors serve to increase the voltage storage capacity of the liquid crystal capacitors.

The contact assistants 81 and 82 are connected to the end portions 129 of the gate lines 121 and the end portions 179 through the contact holes 181 and 182, respectively. Therefore, the contact assistants 81 and 82 function to secure the adhesiveness of the exposed end portions 129 and 179 of the gate and data lines 121 and 171 to external devices, and additionally, to protect the end portions 129 and 179.

A lower alignment layer 11 for determining the alignment of the liquid crystals is disposed on the pixel electrode 191.

A common electrode panel of the LCD includes an insulating substrate 210 made of transparent glass or a plastic material, and is arranged so as to be separated from the lower alignment layer 11 by a selected distance. A light blocking member 220, called a "black matrix," for partitioning the pixel regions is formed in a matrix form on the insulating substrate 210. Color filters, for example red, green, and blue ("RGB") color filters 230R, 230G, and 230B for reproducing the three primary colors required for displaying an image are formed between and partially overlapping the light blocking members 220. The RBG color filters 230R, 230G, and 230B may be formed in a shape of a stripe, and may be formed in separate layers.

In order to protect the light blocking member 220 and the red, green, and blue color filters 230R, 230G, and 230B, an optional overcoat film 250 may be disposed on the light blocking member 220 and the filters. The overcoat film 250 can be made of an organic material, and provides a planarized surface that prevents the color filters from being exposed.

A common electrode 270 made of a transparent conductive material, such as ITO and IZO, is formed on the overcoat film 250. The common electrode 270, together with the pixel electrodes 191, cooperate with each other, as above, to generate an electric field. An upper alignment layer 21 is disposed on the common electrode 270.

As illustrated in FIGS. 9 and 10, the ring-shaped groups of bead spacers 320 are distributed at positions corresponding to the light blocking member 220 on the upper alignment layer 21. As will be noted, the spacers 320 are not disposed at positions corresponding to the protrusions 19a of the recesses 19 of the printing plate 9. The ring-shaped groups of bead spacers thus serve to define and maintain a precise, uniform cell gap between the two display panels. In addition, the spacers also strengthen the elastic force between the display panels, thereby preventing smear defects.

Accordingly, the apparatus of the present invention enables the advantages of bead-type spacers to be obtained in an LCD assembly, along with those of column-type spacers, without the attendant disadvantages of either spacer type. Additionally, the apparatus enables the spacer formation process to be simplified greatly, thus ensuring good LCD yields.

As those of skill in this art will by now appreciate, many modifications, substitutions and variations can be made in the materials, apparatus, configurations and methods of the bead spacer printing apparatus of the present invention without departing from its spirit and scope. In light of this, the scope of the invention should not be limited to that of the particular embodiments illustrated and described herein, as they are only exemplary in nature, but instead, should be fully commensurate with that of the claims appended hereafter and their functional equivalents.

What is claimed is:

1. An apparatus for printing bead spacers on an LCD substrate, comprising:
a rotating cylindrical transfer roller having an exterior surface rotating at a first velocity;
a generally planar printing plate having a plurality of recesses disposed in a first surface thereof for providing bead spacers;
means for loading a volume of an ink containing bead spacers into each of the recesses of the printing plate;
means for translating the first surface of the printing plate at a second velocity that is substantially the same as the first velocity tangentially relative to the exterior surface of the rotating roller such that the volumes of ink in the recesses of the printing plate are transferred onto the exterior surface of the transfer roller;
a support plate having an LCD substrate supported thereon; and,
means for translating the support plate such that a surface of the LCD substrate moves tangentially with respect to and at the same velocity as the exterior surface of the rotating transfer roller and thereby transfers the volumes of ink on the surface of the transfer roller onto the surface of the LCD substrate at respective selected longitudinal and transverse locations thereon,
wherein each of the recesses defines a segment of a sphere, and wherein each recess includes a radial protrusion disposed at a center of the recess.

2. The apparatus of claim 1, wherein the recess in the printing plate have respective longitudinal and transverse locations corresponding to the respective longitudinal and transverse locations of the volumes of ink transferred onto the LCD substrate.

3. The apparatus of claim 1, wherein the radial protrusion defines a segment of a sphere.

4. The apparatus of claim 1, wherein the printing plate comprises glass.

5. The apparatus of claim 4, wherein the recesses are formed with a $CO_2$ laser or a YAG laser.

6. The apparatus of claim 1, wherein the printing plate comprises a layer of glass and a layer of resin.

7. The apparatus of claim 6, wherein the recesses are formed in the resin layer.

8. The apparatus of claim 1, further comprising means for supplying the ink to the printing plate.

9. The apparatus of claim 8, wherein the ink supplying means comprises: a tank for containing the ink; a nozzle for dispensing the ink from the tank onto the printing plate; and, means for stirring the ink in the tank.

10. The apparatus of claim 9, further comprising a pump for pumping the ink from the tank to the nozzle.

11. The apparatus of claim 9, further comprising means for forcing the ink from the tank to the nozzle with a pressurized gas.

12. The apparatus of claim 9, wherein the ink comprises a mixture of bead spacers and a liquid thermosetting or UV-curing binder material.

13. The apparatus of claim 1, further comprising a wiper blade arranged to move in contact with the first surface of the printing plate and thereby force the ink into the recesses.

14. A method for printing bead spacers at selected longitudinal and transverse locations on an LCD substrate, the method comprising:
providing a generally planar printing plate having a plurality of recesses in a first surface thereof for providing bead spacers, the recesses being located at respective longitudinal and transverse locations corresponding to the respective selected longitudinal and transverse locations of the bead spacers on the LCD substrate;
loading a volume of an ink containing bead spacers into each of the recesses of the printing plate;

providing a rotating cylindrical transfer roller having an exterior surface rotating at a first velocity;

translating the first surface of the printing plate at a second velocity that is substantially the same as the first velocity tangentially relative to the exterior surface of the rotating transfer roller such that the volumes of ink in the recesses of the printing plate are transferred onto the exterior surface of the transfer roller;

providing a support plate having the LCD substrate supported thereon; and, translating the support plate such that a surface of the LCD substrate moves tangentially relative to and at the same velocity as the exterior surface of the rotating transfer roller and thereby transfers the volumes of ink on the exterior surface of the transfer roller onto the surface of the LCD substrate at the selected longitudinal and transverse locations thereon, wherein each of the recesses defines a segment of a sphere, and wherein each recess includes a radial protrusion disposed at a center of the recess.

15. The method of claim 14, wherein providing a printing plate comprises:

providing a generally planar glass or resin substrate; and, burning the recesses into the substrate with a laser.

16. The method of claim 15, further comprising disposing an optical system between the substrate and the laser, the optical system having a plurality of circular apertures located at longitudinal and transverse positions corresponding to the respective longitudinal and transverse positions of the recesses in the printing plate, each aperture having a slit pattern in a central portion thereof.

17. The method of claim 14, wherein loading a volume of ink into each of the recesses comprises:

dispensing the ink onto the first surface of the printing plate with a nozzle; and, screeding the ink into the recesses with a wiper blade.

18. The method of claim 17, further comprising conveying the ink to the nozzle from a tank.

19. The method of claim 18, further comprising stirring the ink in the tank.

* * * * *